Figure 1:
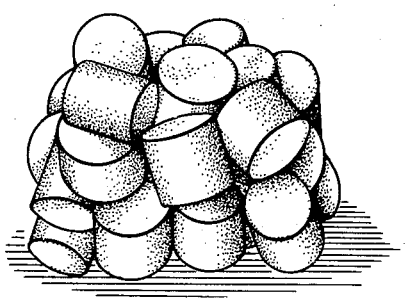

June 23, 1953  W. J. YURGEN  2,642,626
TREATMENT OF RUBBER STOCK

Filed Sept. 14, 1950  2 Sheets-Sheet 1

INVENTOR.
WILLIAM J. YURGEN
BY
Robert J. Patterson
ATTORNEY

June 23, 1953 W. J. YURGEN 2,642,626
TREATMENT OF RUBBER STOCK
Filed Sept. 14, 1950 2 Sheets-Sheet 2

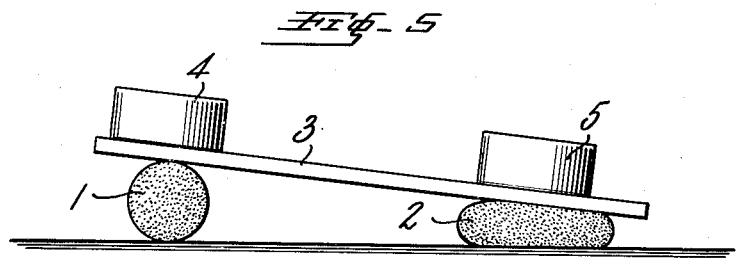

Fig. 5

Fig. 6

MIX UNVULCANIZED
NATURAL RUBBER STOCK OF
NOT OVER 55 DUROMETER HARDNESS
(SHORE SCALE A)
↓
EXTRUDE AND CUT TO SIZE
↓
FREEZE TO −50°C. OR BELOW
↓
THAW TO ATMOSPHERIC TEMPERATURE
↓
STOCK OF GREATLY INCREASED DIMENSIONAL STABILITY
AND RESISTANCE TO CONSOLIDATION
↓
USE IN MOLDING OPERATION

INVENTOR.
WILLIAM J. YURGEN
BY
Robert J. Patterson
ATTORNEY

Patented June 23, 1953

2,642,626

UNITED STATES PATENT OFFICE 2,642,626

TREATMENT OF RUBBER STOCK

William James Yurgen, Fort Wayne, Ind., assignor to United States Rubber Company, New York, N. Y., a corporation of New Jersey Application September 14, 1950, Serial No. 184,770

8 Claims. (Cl. 18—48)

This invention relates to the treatment of rubber stock and more particularly to the treatment of extremely soft unvulcanized natural rubber stock having a durometer hardness (Shore scale "A") of not over 55 in such a way as to impart to the stock greatly improved dimensional stability and resistance to deformation and to consolidation between contacting pieces of stock upon standing under atmospheric conditions.

In the rubber industry, for certain purposes it is necessary to employ very soft unvulcanized natural rubber stock, that is, a stock having a durometer hardness of not over 55. In accordance with conventional practice such a stock is compounded and is then shaped as by calendering and sheeting or by extrusion. For example, the compounded stock is extruded or "tubed" in an extruding machine to give an extruded shape which is cut off at intervals to give pieces or lengths of the correct length for further processing which typically involves placing the pieces singly in the cavities of a mold and subjecting therein to pressure and heat to form the final vulcanized article. The cut pieces of soft stock are accurately sized for insertion in the mold cavities.

However, handling of such extremely soft stock presents a very serious problem in that upon standing under ordinary atmospheric conditions which prevail in the typical rubber plant the soft stock very rapidly undergoes sagging or deformation, usually in a matter of hours. This sagging or deformation takes the form of flowing of the mass so that it loses its original shape and becomes a mis-shapen mass which is useless for anything except re-working which cuts down productivity and greatly increases cost of production. In addition, if two or more pieces of the soft stock are allowed to stand in contact with one another, as is typically the case when the pieces are handled under plant conditions, as, for example, when a mass of randomly distributed pieces is disposed in a "tote box" in which they are kept or transported from one processing area to another, the pieces rapidly merge or coalesce along the areas of contact to such an extent that they can be separated sometimes only with great difficulty, and more commonly not at all. As a result of both sagging and consolidation, production is seriously interfered with because material deformation of the uncured shapes makes it difficult and more often impossible for the operator to insert the shapes into the mold cavities preparatory to a molding operation, and consolidation of the several pieces makes it equally difficult or impossible to use them in the molding operation.

The problem of deformation and consolidation can be explained by the following illustration: A very soft 28 to 32 durometer (Shore scale "A") compounded natural rubber stock is extruded into 72" length strands of oval cross-section, ⅜" across in one dimension and ¾" across in the other dimension. In the normal procedure the cut strands of tubed stock are placed lengthwise on a leaf truck or in some container and are subsequently cut into pellets ½" long. The time interval between extruding and cutting and the time interval between cutting and using (molding and vulcanizing) will vary widely with varying plant conditions. However, within from ½ to 1 hour after the extruding operation, noticeable deformation and sagging occur in the stranded or pelletized stock. The degree of deformation is largely determined by time; within from 12 to 24 hours the soft uncured stock deforms into a mis-shapen mass unsuitable for further use unless re-worked. In the case of the pelletized stock, at the end of the 12 to 24 hour period, there also occurs consolidation of the pellets, which are normally maintained in a randomly distributed fashion in contact with one another as would be the case when they are placed in a "tote" box to be kept until use, into a mis-shapen mass in which adjacent pellets have merged with one another, so that their individual identity is destroyed, to such an extent that they cannot be separated.

This rapid occurrence of deformation and consolidation of shaped pieces of low durometer uncured natural rubber stocks places a severe limitation upon processing because unless the shaped stocks are molded before substantial deformation or consolidation has taken place, the shaped stocks become scrap which must be reworked at great added cost.

Many stocks of say 30 durometer or less are so soft that they must be used (i. e., molded) within a matter of hours from the time of shaping and even then the shaped pieces frequently must be given extremely costly individual treatment as by being placed individually (out of contact with one another) on a tray covered with Holland cloth and transported to the molding station so carefully that the pieces do not come in contact with one another; even with such precautions they often sink down or sag to such an extent that the step of placing them in the mold cavity is greatly hampered or even made impossible within an extremely short period of time.

I have now discovered that the foregoing difficulties incident to the preforming and molding of such extremely soft (durometer hardness measured on Shore scale "A" not over 55) uncured natural rubber stocks can be completely overcome in a simple, commercially feasible, and highly effective manner by merely freezing the stock at a temperature of not over −50° C. and then thawing the frozen stock, that is, allowing it to return to atmospheric or ambient temperature. Treatment of the soft stock in this way unexpectedly imparts to it greatly increased dimensional stability and resistance to sagging or deformation and greatly increased resistance to consolidation of contacting surfaces upon standing for prolonged periods of time under ordinary atmospheric conditions such as prevail in the usual rubber plant.

I am unable to explain the mechanism involved in my invention or to advance a theory which will explain why freezing and thawing of such extremely soft unvulcanized natural rubber stocks gives rise to the effects noted. However, I have repeatedly demonstrated these effects both experimentally and in plant production. I have applied my invention to both extruded and non-extruded stock with equal results, thereby demonstrating that the phenomenon observed is not dependent upon any molecular orientation imparted in the extruding operation. I have also determined that the phenomenon is not attributable to the presence of softeners or plasticizers in the stock; I did this by showing that the dimension stabilizing and increased resistance to consolidation are obtained with straight gum rubber. I have found, however, that milling increases the stabilizing effect of freezing and thawing although I cannot explain why this should be the case.

The freezing of the soft uncured stock can be effected in any desired manner which will insure that substantially the entire mass of the stock is brought to a temperature at least as low as −50° C. This is most conveniently done by placing the shaped, for example, extruded or calendered, pieces of stock in a suitable container, mixing them intimately with crushed "Dry Ice" (solidified carbon dioxide), and allowing the mixture to stand for ½ to 2 hours until the temperature at the innermost or most central portions of the pieces has been brought to −50° C. or lower. The freezing can be done by allowing to stand or by tumbling the pieces of stock with the "Dry Ice"; tumbling is most advantageously applied to extruded and cut pieces of stock (i. e., pellets).

I am not limited to the use of solidified carbon dioxide to achieve the freezing but can use any means which will bring the temperature of the uncured natural rubber down to −50° C. or lower.

There is no lower limit on the temperature at which the soft uncured stock is frozen. Thus it can be as low as −100° C. or even lower. However, the use of temperatures much below −70° C. is practically precluded by the expense of attaining such temperatures.

The stock should be frozen to such an extent that it cannot be indented with the finger nail. The exact freezing temperature used in practice will vary somewhat with the different stocks; for example with low durometer stocks which are especially compounded for molding articles which are intended to remain flexible when used in extremely cold climates as for example in arctic regions, freezing to −60° C. or below is desirable.

The effect of freezing to −50° C. or below followed by thawing, in increasing the dimensional stability and resistance to deformation and consolidation, is limited to low durometer stocks, i. e., those with a durometer rating of not over 55. Higher durometer stocks adequately retain their shape and resist coalescence upon prolonged standing. It is only the low durometer stocks that exhibit the unusual properties of rapidly flowing, resembling thick molasses in flow characteristics except that the soft rubber stocks initially appear firm, and it is only to such stocks that the present invention is applicable with practical benefits.

The temperature of −50° C. is, so far as I am aware, critical in carrying out the present invention. Thus, samples of the same extruded and cut soft (durometer hardness of 35) uncured natural rubber compositions were frozen at 0° C., −20° C., −40° C. and −60° C. for substantially identical periods of time and were subsequently thawed and compared with standard room temperature samples which had not been frozen at all. All of the pellets were uniform dimensionally. When the frozen samples had completely thawed out a standard weight was placed upon each of the samples and they were then allowed to stand at room temperature. The samples were measured hourly, daily, and weekly to observe the rate of deformation. Deformation took place within an hour in the standard room temperature sample, in the 0° C. sample, and in the −20° C. sample while the −40° C. sample and the −60° C. sample were not affected at the end of one hour. Within a few hours the standard room temperature sample, the 0° C. and the −20° C. sample were so deformed as to be totally unusable in the press room for molding purposes. After a few days, the −40° C. sample was quite deformed but the −60° C. sample had substantially its original dimensions; at this time the standard room temperature sample, the 0° C. sample and the −20° C. sample had attained a dimensionless state and would have to be re-milled and re-extruded to be used. At the end of four months the −40° C. sample was so deformed that its use in molding would be impractical but no visible deformation of the −60° C. sample had occurred.

My invention is also limited to natural rubber stocks. I have attempted to demonstrate the peculiar phenomenon noted above with stocks made from synthetic rubbers, including GR–S (butadiene-styrene rubbery copolymer), Butyl rubber and neoprene (polychloroprene) but have been unsuccessful in these attempts. So far as I now know, the effects of freezing at −50° C. or below followed by return to room temperature are unattainable with other than natural rubber stocks. I can, however, apply the principles of my invention to soft stocks made with mixtures of natural rubber and compatible synthetic rubber, e. g., GR–S. The effects of the treatment are most pronounced with such mixtures wherein at least half of the total rubber content is natural rubber.

While my invention can be applied to stocks having a durometer hardness of from 40 to 55, the greatest benefits in practice are obtained when it is applied to stocks of 25 to 40 durometer rating. It may be economically feasible to apply the present invention to 40 to 55 durometer stocks particularly where such stocks are to be kept for long periods of time between shaping and molding.

In commercial application of my invention to stocks having a durometer hardness much below 25, say 15 to 20, in many cases the extruding step would not be used. Such exceedingly low durometer stocks would in most cases be milled, calendered, and sheeted off the calender, the resulting sheets being fed directly to the freezing step of my invention. The same technique can be applied to the higher durometer stocks, i. e., those having a durometer hardness of from 25 to 55 but the present state of the art is such that with such higher durometer stocks, it is generally preferable to extrude them.

In addition to the advantages of much better dimensional stability and resistance to coalescence, the freezing step of my invention facilitates subsequent cutting of the stock. The cutting is preferably carried out after the frozen stock has warmed up substantially, e. g., to a temperature of at least 0° F. In this type of processing the stock typically is cut while it is thawing out although it can be cut after it has returned to room temperature. The freezing step materially facilitates the cutting operation in that the cutting knife cuts through the stock more cleanly and more smoothly, and tearing of the stock and binding during cutting are eliminated. These advantages during cutting are obtained even after the stock has completely thawed out, i. e., after it has returned to atmospheric temperature. It is believed that the better cutting of the completely thawed stock is closely tied up with its better dimensional stability and its greater resistance to consolidation upon standing. The better cutting eliminates gumming up of the knife blade and variations in size of the cut pieces dimensionally, enabling the operator to secure a much more uniform weight and size per piece. Thus the accumulation of scrap is greatly reduced.

It is noteworthy that the effects of freezing and thawing of soft natural rubber stocks in accordance with my invention are destroyed or removed by heating the thawed stock to a considerably elevated temperature, say to 150° C. For this reason, it is necessary to prevent heating of the stock to temperatures substantially above atmospheric temperature before using the stock in the final molding (vulcanizing) operation, in order to obtain the advantages of increased dimensional stability and resistance to coalescence between adjacent portions of stock. The fact that the high temperature used in vulcanizing removes the properties imparted by the freezing and thawing steps is of course of no consequence because these properties have already served their purpose.

Figure 2:
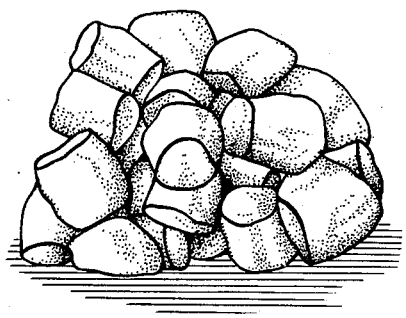
Figure 3:
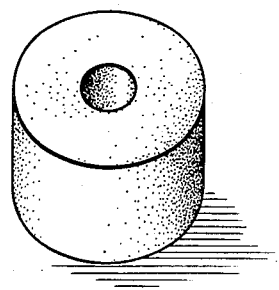
Figure 4:
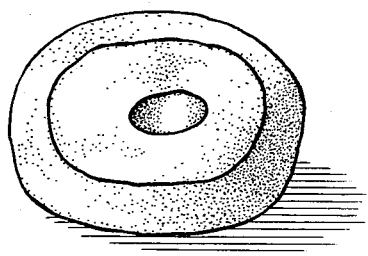

In the accompanying drawings, Fig. 1 shows a mass of cylindrical pellets of 30 durometer stock which have been frozen to −60° C., subsequently allowed to thaw to room temperature and thereafter allowed to stand for one month at room temperature. No appreciable deformation of the pellets or consolidation between contacting pellets has occurred at the end of this time. In contrast, Fig. 2 shows the deformation and consolidation to a shapeless, useless mass which occurs with identical pellets made of the same stock when the freezing and thawing steps are omitted. Fig. 3 shows a large hollow cylinder of 30 durometer stock which has been frozen to −60° C., subsequently allowed to thaw out and thereafter allowed to stand with a one kilogram weight resting upon its upper face for three months. Fig. 4 shows the appearance of an identical shape of the same stock after the same treatment except that the freezing and thawing steps were omitted.

Fig. 5 illustrates a convenient method of testing cylindrical pellets for deformation upon standing under load. A pellet 1 of 30 durometer stock which has been frozen and thawed in accordance with the present invention and a pellet 2 of the same shape and made from the same stock but which has not been so treated are used in the test illustrated. These pellets are laid on their sides and a steel bar 3 is placed across them whereupon equal weights 4 and 5 are placed upon bar 3. The assembly is then allowed to stand at room temperature. The unfrozen pellet 2 rapidly sags resulting in marked lowering of the end of the bar 3 adjacent it.

Fig. 6 is a self-explanatory diagram of the steps involved in a typical embodiment of the present invention.

The following examples more fully illustrate the present invention. All parts are by weight.

*Example I*

In the manufacture of an industrial mounting, a 30 durometer (Shore scale "A") natural rubber stock was used. This stock had the following formulation:

| | |
|---|---|
| Natural rubber (smoked sheets) | 72.5 |
| Zinc oxide | 3 |
| Accelerator | 0.6 |
| Light magnesium carbonate | 6.2 |
| Stearic acid | 0.7 |
| Hydrocarbon oil | 0.5 |
| Wax | 1.3 |
| Asphaltic oil | 7.0 |
| Pine tar | 1.7 |
| Titanium dioxide | 2.0 |
| Ultramarine Blue | 2.5 |
| Sulfur | 2.0 |

These ingredients were intimately mixed in the conventional manner on the usual rubber mill; the resulting mixture was then sheeted off the mill and was then extruded on a conventional extruding machine into a cylinder ½" in diameter. This cylinder was cut off to form pellets 1" in length which were designed to closely fit into the cavities of the mold. These pellets were accumulated in a "tote pan" and were then mixed with crushed solidified carbon dioxide and allowed to stand for two hours whereby the pellets were frozen to about −60° C. The cooling to this temperature extended entirely into the center of the pellets and they became so hard that they could not be indented with the finger nail. An extra measure of time was allowed in the freezing step as a safety precaution to insure complete freezing of the entire mass of the pellets to the desired temperature. After the two hour period had elapsed, the mass of pellets was allowed to stand until it returned to room temperature. The pellets were then allowed to stand in the open air for a short period of time to remove any moisture condensed thereon from the atmosphere and were then held for use in the molding operation. No difficulty whatever was experienced with deformation or consolidation of the pellets even though no special precautions were observed. The pellets could be used without difficulty in the molding operation as long as 30 days after their return to atmospheric temperature whereas ordinarily they would have deformed and consolidated to a useless shapeless mass within a matter of hours after the extruding and cutting steps.

*Example II*

A stock having a durometer hardness of 35 (Shore scale "A") was made with the following formulation:

| | |
|---|---|
| Smoked sheets | 30 |
| GR-S | 26 |
| Carbon Black | 12.3 |
| Zinc oxide | 20 |
| Pine tar | 3.9 |
| Hydrocarbon oil | 4.9 |
| Stearic acid | 0.4 |
| Sulfur | 1.8 |
| Accelerator | 0.7 |

These ingredients were mixed and treated in the same manner as in Example I with the same highly advantageous results.

From the foregoing description it will be seen that the present invention presents many advantages over conventional practice in the art of handling soft uncured natural rubber stocks. The principal advantage is that it greatly expedites the molding operation and greatly reduces the amount of scrap by preventing the deformation of the shaped preforms and consolidation of contacting preforms between the preforming operation and the molding operation. The invention provides a simple, effective and economical method of bringing about such a physical or chemical transformation within the structure of the preforms of soft rubber stock that long-lasting rigidity or dimensional stability and resistance to coalescence are imparted thereto long after the rubber has thawed out. As a result of the changes which take place in the soft rubber stock during the freezing, and which are retained upon thawing, the thawed pellets of stock can be stored for any reasonable length of time at room temperature without deformation to a substantial degree, i. e., to an extent which would interfere with proper molding.

Another advantage of the present invention is that the cost of freezing the stock and subsequently thawing it to room temperature is sufficiently low to justify commercial utilization of my invention. The reduction in labor in handling and molding and the reduction in scrap which are brought about by the present invention are so great as to more than justify the moderate cost of practicing the present invention. Another advantage is that the application of the present invention to the soft stocks does not interfere in any manner with utilization of such stocks but rather expedites such utilization. The application of my invention gives rise to an ease and facility of utilizing such low durometer stocks never before known to the art. Numerous other advantages of the present invention will be obvious to those skilled in the art.

Having thus described my invention, what I claim and desire to protect by Letters Patent is:

1. The method which comprises freezing shaped pieces of unvulcanized natural rubber stock so compounded with filler and softener as to have a durometer hardness (Shore scale "A") of not over 55, said pieces although initially appearing firm exhibiting the undesired properties of rapid deformation and of rapid consolidation of contacting pieces upon standing under atmospheric conditions, at a temperature of not over −50° C., and thawing the frozen stock, the resulting thawed stock manifesting greatly improved dimensional stability, resistance to deformation upon standing under atmospheric conditions, and resistance to consolidation between contacting surfaces of stock upon so standing as compared to like stock which has not been so frozen and thawed.

2. The method which comprises freezing shaped pieces of unvulcanized natural rubber stock so compounded with filler and softener as to have a durometer hardness (Shore scale "A") of from 25 to 40, said pieces although initially appearing firm exhibiting the undesired properties of rapid deformation and of rapid consolidation of contacting pieces upon standing under atmospheric conditions, at a temperature of not over −50° C., and thawing the frozen stock, the resulting thawed stock manifesting greatly improved dimensional stability, resistance to deformation upon standing under atmospheric conditions, and resistance to consolidation between contacting surfaces of stock upon so standing as compared to like stock which has not been so frozen and thawed.

3. The method which comprises freezing extruded and cut pieces of unvulcanized natural rubber stock so compounded with filler and softener as to have a durometer hardness (Shore scale "A") of from 25 to 40, said pieces although initially appearing firm exhibiting the undesired properties of rapid deformation and of rapid consolidation of contacting pieces upon standing under atmospheric conditions, at a temperature of not over −50° C., and thawing the frozen pieces, the resulting thawed pieces of stock manifesting greatly improved dimensional stability, resistance to deformation upon standing under atmospheric conditions, and resistance to consolidation between contacting pieces upon so standing as compared to pieces of like stock which have not been so frozen and thawed.

4. The method which comprises freezing shaped pieces of milled unvulcanized natural rubber stock so compounded with filler and softener as to have a durometer hardness (Shore scale "A") of not over 55, said pieces although initially appearing firm exhibiting the undesired properties of rapid deformation and of rapid consolidation of contacting pieces upon standing under atmospheric conditions, at a temperature of not over −50° C., and thawing the frozen stock, the resulting thawed stock manifesting greatly improved dimensional stability, resistance to deformation upon standing under atmospheric conditions, and resistance to consolidation between contacting surfaces of stock upon so standing as compared to like stock which has not been so frozen and thawed.

5. The method which comprises freezing shaped pieces of milled unvulcanized natural rubber stock so compounded with filler and softener as to have a durometer hardness (Shore scale "A") of from 25 to 40, said pieces although initially appearing firm exhibiting the undesired properties of rapid deformation and of rapid consolidation of contacting pieces upon standing under atmospheric conditions, at a temperature of not over −50° C., and thawing the frozen stock, the resulting thawed stock manifesting greatly improved dimensional stability, resistance to deformation upon standing under atmospheric conditions, and resistance to consolidation between contacting surfaces of stock upon so standing as compared to like stock which has not been so frozen and thawed.

6. The process which comprises intimately milling unvulcanized natural rubber with compounding and vulcanizing ingredients and thereby forming a stock having a durometer hardness (Shore scale "A") of from 25 to 40, extruding said stock, cutting the extruded stock into pieces of a length suitable for molding, freezing said pieces at a temperature of not over −50° C., thawing the frozen pieces, preventing the thawed pieces from attaining a temperature substantially above atmospheric until the molding and vulcanizing step, molding and vulcanizing the thawed pieces, said thawed pieces manifesting greatly improved dimensional stability, resistance to deformation upon standing under atmospheric conditions, and resistance to consolidation between contacting pieces upon so standing as compared to pieces of like stock which have not been so frozen and thawed.

7. The process which comprises intimately milling unvulcanized natural rubber with compounding and vulcanizing ingredients and thereby forming a stock having a durometer hardness (Shore scale "A") of not over 55, extruding said stock, freezing said stock at a temperature of not over −50° C., allowing the frozen stock to return to atmospheric temperature, cutting the stock into pellets at a time subsequent to the extruding step, placing the pellets which have returned to atmospheric temperature in mold cavities and vulcanizing them therein to form the finished product, preventing the thawed pellets from attaining a temperature substantially above atmospheric prior to placing them in said mold cavities, said freezing step imparting to the stock upon its return to atmospheric temperature greatly improved dimensional stability, resistance to deformation upon standing under atmospheric conditions, and resistance to consolidation between contacting surfaces of stock upon so standing as compared to like stock which has not been so frozen.

8. The process which comprises intimately milling unvulcanized natural rubber with compounding and vulcanizing ingredients and thereby forming a stock having a durometer hardness (Shore scale "A") of from 25 to 40, extruding said stock, freezing said stock at a temperature of not over −50° C., allowing the frozen stock to return to atmospheric temperature, cutting the stock into pellets at a time subsequent to the extruding step, placing the pellets which have returned to atmospheric temperature in mold cavities and vulcanizing them therein to form the finished product, preventing the thawed pellets from attaining a temperature substantially above atmospheric prior to placing them in said mold cavities, said freezing step imparting to the stock upon its return to atmospheric temperature greatly improved dimensional stability, resistance to deformation upon standing under atmospheric conditions, and resistance to consolidation between contacting surfaces of stock upon so standing as compared to like stock which has not been so frozen.

WILLIAM JAMES YURGEN.

References Cited in the file of this patent

UNITED STATES PATENTS

| Number | Name | Date |
|---|---|---|
| 226,057 | Gerner | Mar. 30, 1880 |
| 1,675,124 | Minor | June 26, 1928 |
| 1,988,902 | Keppeler | Jan. 22, 1935 |
| 2,167,215 | Leary | July 25, 1939 |
| 2,215,435 | Hale | Sept. 17, 1940 |